UNITED STATES PATENT OFFICE 2,476,308

WATER-IN-OIL TYPE EMULSION

David X. Klein, Andover, Mass., assignor to E. I. du Pont de Nemours & Company, Wilmington, Del., a corporation of Delaware No Drawing. Application December 4, 1946, Serial No. 713,933

4 Claims. (Cl. 252—312)

This invention relates to emulsions of the water-in-oil type.

It is an object of this invention to produce stable, water-in-oil emulsions, using economic and readily available materials. Other and further important objects of this invention will appear as the description proceeds.

According to my invention, these objects are accomplished by using as dispersing agent a polymer of a long-chain-alkyl siliconic acid, which may be pre-formed or developed in situ. The long-chain-alkyl siliconic acid that I am speaking of is a compound which in its monomeric state may be considered as having the formula

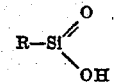

wherein R is an alkyl radical having not less than 12 carbon atoms. Actually, however, the monomer does not occur in commerce, and instead one handles polymers of said siliconic acid or of its anhydride

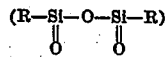

of uncertain constitution.

The polymers are readily formed by hydrolysis of an alkyl-silicon triester, such as the trichloride, R—SiCl₃; the triethoxy derivative,

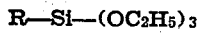

or the tri-polyglycol ester of copending application of Klein and Kvalnes, Serial No. 700,834, having the formula R—Si—(Q—OH)₃, wherein Q designates a polymeric glycol radical as typified by the chain radical

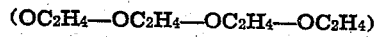

In all the above formulas it is understood that R is an alkyl radical of at least 12 carbon atoms, as typified by dodecyl, $C_{12}H_{25}$; octadecyl, $C_{18}H_{37}$; docosyl, $C_{22}H_{45}$; octacosyl, $C_{28}H_{57}$; etc.

The polymer may first be formed in substance and then entered into the mixture of oil and water being emulsified (or into either one of these phases prior to mixing), or one of the aforementioned initial materials, for instance the trichloride may be employed, with the result that hydrolysis and polymerization take place in situ during the emulsification of the two phases. The emulsification step proper is achieved, as usual, by vigorously agitating the two phases together, which may be achieved by hand or in any suitable machine commonly employed for this purpose, for instance a micronizer or homogenizer.

My invention will now be further illustrated by the following examples, it being understood that there is no intent to limit the invention thereby. The parts indicated, clearly, may be varied to any optional magnitude so long as the same relative proportions are maintained.

*Example 1.—Water-benzene emulsion*

500 cc. of a 5% solution of octadecyl silicon trichloride ($C_{18}H_{37}SiCl_3$) in benzene was diluted, while stirring vigorously, with 1500 cc. of water. A stiff, white and very stable paste resulted which contained the water dispersed in the oil.

*Example 2*

110 cc. of benzene containing .1 gm. of $C_{18}H_{37}SiCl_3$ were diluted with 100 cc. of water while stirring vigorously. A stiff, stable emulsion resulted.

*Example 3.—Water-carbon tetrachloride emulsion*

0.3 gm. of octadecyl silicon trichloride were dissolved in 100 cc. of carbon tetrachloride and vigorously stirred with 100 cc. of water. A stiff, stable suspension resulted.

*Example 4.—Water-gasoline emulsion*

0.28 gm. of $C_{18}H_{37}SiCl_3$ were dissolved in 100 cc. of gasoline and emulsified with 100 cc. of water. A very stiff, stable paste resulted.

*Example 5.—Water-lubricating oil emulsion*

0.15 gm. of $C_{18}H_{37}SiCl_3$ and 100 cc. of lubricating oil (SAE 30) were emulsified with 150 cc. of water. A thick, stable suspension resulted.

*Example 6.*—Use of dodecyl silicon trichloride ($C_{12}H_{25}SiCl_3$) in place of the octadecyl silicon trichloride in Example 1 yielded a softer paste.

It will be understood that the above examples are merely illustrative, and that the details of procedure may be varied widely within the skill of those engaged in this art. Thus, in lieu of the alkyl-silicon-trichloride in the above examples, one may use the corresponding tribromide, triiodide or tri(polyglycol-200) as described in copending application, Serial No. 700,834 of myself and Kvalnes.

The quantity of the siliconic agent may be as low as 0.02% by weight based on the total weight of the organic and aqueous phases, and as high as 3%. With the alkyl-silicon trichlorides, optimum results are generally obtained by using 0.1% by weight on the above basis.

The mixing of the two phases may be effected by adding the organic liquid to the water or vice versa, and the emulsifying agent may be incorporated initially in either phase. It has also been found operable to mix the two dissimilar phases vigorously and drop the emulsifying agent into them. However, the preferred procedure is that involving addition of water to a solution of the silicon compound in the organic solvent.

After the emulsion is formed, or during its preparation, a neutralizing agent, ammonia for instance, may be added to remove the acidity which results from the hydrolysis of chloride atoms.

Furthermore, one may start with a pre-formed polymer of the monomeric acid (R–SiO.OH) as above defined, and incorporate the same in one or the other of the phases or into a mixture of the two. In such cases, the addition of alkaline agents to the mass becomes superfluous.

The advantages and potential uses of my invention will now be readily understood. At the present time, there are relatively few emulsifying agents which have the capacity of producing a water-in-oil type of emulsion. My invention therefore opens up a vast field of possibilities in this respect, and is economical of execution. The emulsions thus produced may be used for a variety of purposes such as the incorporation of small amounts of water in fuels for the sake of improving their combustion properties, the preparation of greases and cutting-oils containing water, preparation of polishes and creams having a stiff consistency, and manufacture of spot-cleaning preparations, fire extinguisher foams, face creams, mayonnaise, etc.

In the claims below, the expression "water-in-oil type emulsion" is to be understood as defining emulsions wherein water is the discontinuous phase and an oily organic liquid is the continuous phase.

I claim as my invention:

1. A stable, water-in-oil emulsion comprising water, a water-immiscible organic liquid, and an emulsifying agent, said organic liquid constituting the continuous phase of the system, the water constituting the discontinuous phase, and said emulsifying agent consisting of a polymer of an alkyl-siliconic acid of the general formula R—SiO.OH, wherein R represents an alkyl radical of 12 to 28 carbon atoms; said emulsifying agent being present in quantity between 0.02% and 3% based on the total weight of emulsion, and said emulsion being free of other emulsifying agents.

2. A water-in-oil emulsion as defined in claim 1 said emulsifying agent being octadecyl-siliconic acid polymer.

3. An emulsion as specified in claim 1, the emulsifying agent being present in quantity corresponding substantially to 0.1% based on the total weight of the emulsion.

4. An emulsion as specified in claim 1, the organic liquid being a hydrocarbon.

DAVID X. KLEIN.

REFERENCES CITED

The following references are of record in the file of this patent:

UNITED STATES PATENTS

| Number | Name | Date |
|---|---|---|
| 2,375,998 | McGregor et al. | May 15, 1945 |
| 2,406,671 | Diamond | Aug. 27, 1946 |

OTHER REFERENCES

National Paint Bulletin, Oct., 1945, pages 5, 6, 12 and 13, "Organic Silicon Polymers."

Certificate of Correction

Patent No. 2,476,308.

July 19, 1949.

DAVID X. KLEIN

It is hereby certified that errors appear in the printed specification of the above numbered patent requiring correction as follows:

Column 2, line 12, for "5%" read .5%; column 3, lines 39 and 40, and column 4, lines 1 to 3 inclusive, strike out the following paragraph:

> In the claims below, the expression "water-in-oil type emulsion" is to be understood as defining emulsions wherein water is the discontinuous phase and an oily organic liquid is the continuous phase.

and that the said Letters Patent should be read with these corrections therein that the same may conform to the record of the case in the Patent Office.

Signed and sealed this 6th day of December, A. D. 1949.

[SEAL]

THOMAS F. MURPHY,
*Assistant Commissioner of Patents.*